United States Patent [19]

Engdahl

[11] 4,012,052
[45] Mar. 15, 1977

[54] DEVICE FOR LIMITING PIVOTAL MOVEMENTS OF A LAWN MOWER HANDLE

[75] Inventor: Karl Torsten Lennart Engdahl, Malmo, Sweden

[73] Assignee: Flymo Societe Anonyme, Zug, Switzerland

[22] Filed: Oct. 2, 1975

[21] Appl. No.: 618,801

[30] Foreign Application Priority Data

Oct. 11, 1974 United Kingdom ............ 44073/74

[52] U.S. Cl. .................. 280/47.37 R; 16/110 R
[51] Int. Cl.² .................................. B62B 11/00
[58] Field of Search .......... 280/47.37; 16/110, 112, 16/113, 111 A; 292/273, 274, 271, 272, 277

[56] References Cited

UNITED STATES PATENTS

| 123,707 | 2/1872 | Kind ............... 280/47.37 R |
| 599,208 | 2/1898 | White ............ 280/47.37 R |
| 2,008,376 | 7/1935 | White ............ 280/47.37 R |
| 2,786,694 | 3/1957 | Gray .............. 280/47.37 R |

Primary Examiner—Robert R. Song
Attorney, Agent, or Firm—Laurence R. Brown

[57] ABSTRACT

A lawn mower has a pivoted handle with a link thereon engaging cam-like slot structure on the housing to selectively confine handle positions. A lever on the handle will change link position in the slot to select one of a plurality of handle positions.

1 Claim, 3 Drawing Figures

DEVICE FOR LIMITING PIVOTAL MOVEMENTS OF A LAWN MOWER HANDLE

This invention relates to a device for limiting the pivotal movements of a lawn mower handle pivotally connected to a lawn mower housing.

It is known to provide stops limiting the pivotal movements of a pivotally mounted lawn mower handle. It is also known to provide detent means for arresting such a handle in one or more pivotal positions. Further it is known to provide means for manually eliminating the effects of such stops and detent means. However, some of the known devices may be inconvenient so that many operators will be inclined to ignore them, although when properly used such devices may improve operation and safety.

The present invention is intended to provide a device for limiting the pivotal movements of a lawn mower handle pivotally attached to a lawn mower housing, which device is easy to operate and which gives a wide range of possible combinations of stops without increase in manufacturing costs.

According to the present invention there is provided a device for limiting the pivotal movements of a lawn mower handle pivotally connected to a lawn mower housing, characterised by a connecting link which at one end is pivotally connected to a part of said handle and at the other end protrudes into a slot arranged in an element rigidly connected to the housing, the said slot limiting the vertical movements of the said link other end, the said slot being provided with branched-off, blind-end slot parts which the said link other end may leave only by a reverse movement followed by a manual elevating movement.

Figure 1:
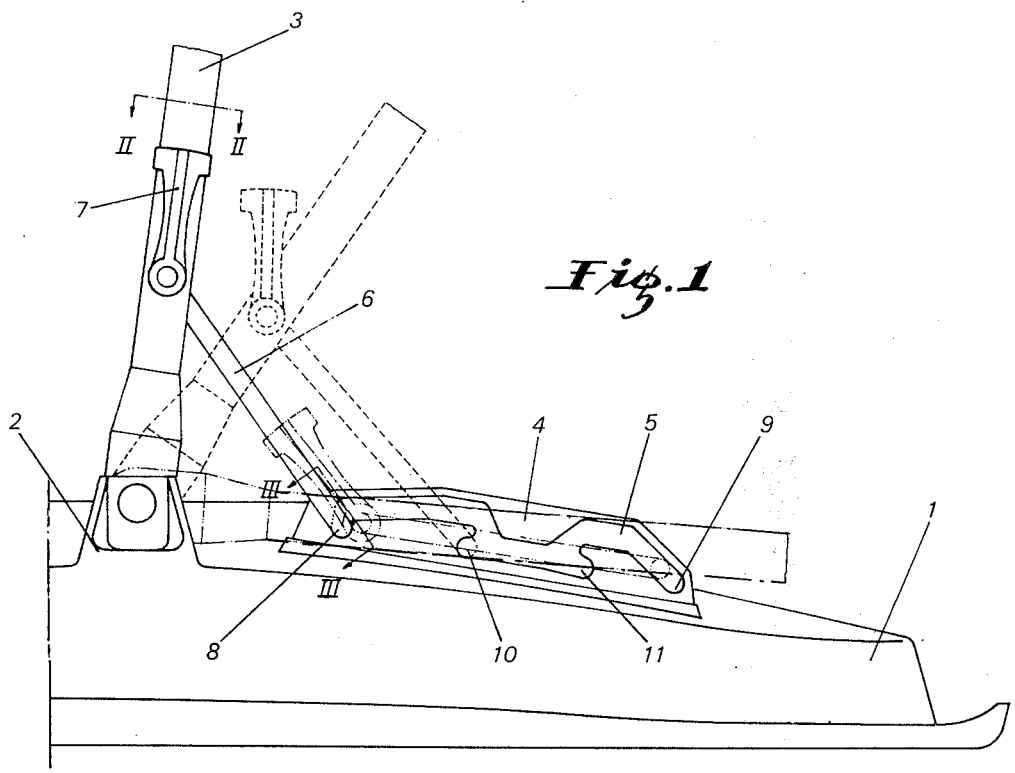
Figure 2:
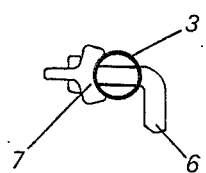
Figure 3:
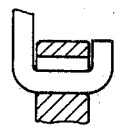

How the invention may be put into practice is described in more detail with reference to the accompanying drawing, in which FIG. 1 is a side view of a device according to the invention, and FIG. 2 and FIG. 3 are sections along the lines II—II and III—III respectively of FIG. 1.

The drawing shows a part of a lawn mower housing 1 provided with a pair of brackets 2, only one of which is shown, for pivotal connection of a handle, of which only one leg 3 is shown.

Rigidly secured to the top of the housing 1 is an element 4 having a sidewardly open slot 5 receiving the lower bent off end of a link 6. Said link 6 is pivotally connected to the leg 3, having a portion extending through said leg 3. A fork part 7 is rigidly connected to the portion of the link 6 extending through the leg 3 and serves as a lever for manually influencing the pivotal motions of the link 6. In the position shown in full lines the fork part 7 also secures the leg 3 relative to the link 6, such arresting being obtained if the fork part 7 partly surrounds the leg 3 as shown in full lines. In this position the handle is approximately vertical, which is convenient when the mower is temporarily standing idle. Said fork part 7 is made of a resilient material thus making it possible to eliminate the arresting effect by manual force on the mower handle.

The slot 5 comprises two ends 8 and 9 which limit the pivotal movements of the handle between approximately vertical and horizontal end positions. The slot 5 also comprises branched-off, blind-end slot parts 10 and 11.

The device described will operate as follows.

If the handle leg 3 is in the position shown in full lines in the drawing, i.e. the approximately vertical end position — the handle may be pivotally displaced downwardly only if the fork part 7 is manually released and turned counter-clockwise to raise the lower end of the link 6.

The handle leg 3 may now be depressed pivotally while the lower end of the link 6 is sliding in the slot 5. However, eventually the link 6 will enter into the branched-off slot part 11. A further depression of the handle 3 is now impossible unless the handle leg 3 is elevated slightly while the fork part 7 is manually turned counter-clockwise to raise the lower end of the link 6. After a following small pivotal depression of the handle leg 3, the manual influence on the fork part 7 may cease and the handle is allowed to move whilst the lower end of the link 6 moves towards the end 9 of the slot 5.

During a following elevation of the handle 3 the lower end of the link 6 will enter into the branched-off slot part 10, preventing further unintended upwards movements of the handle leg 3. Movements towards the approximately vertical position of the handle leg 3 will be possible only if the handle is slightly depressed while the fork part 7 is influenced manually in the counter-clockwise direction. This manual influence is also necessary during a following slight upwards pivotal movement of the handle leg 3.

It will be understood that during normal operation of the mower angular movements of the handle leg 3 will be allowed between end positions defined by the branched-off blind slot parts 10 and 11. The extreme high and low angles of the handle may be obtained only after manual lifting of the lower end of the link 6 by means of the fork part 7.

What is claimed is:

1. A device for limiting the pivotal movements of a lawn mower handle pivotally connected to a lawn mower housing, characterised by a connecting link which at one end is pivotally connected to a part of said handle and at the other end protrudes into a slot arranged in an element rigidly connected to the housing, the said slot limiting the vertical movements of the said link other end, the said slot being provided with branched-off, blind-end slot parts which the said link other end may leave only by a reverse movement followed by a manual elevating movement wherein the said link has a portion extending through said handle and secured to a resilient fork part for arresting said handle at a pre-determined relative angle between said link and said handle.

* * * * *